C. E. RODGERS.
CULTIVATOR.
APPLICATION FILED JAN. 21, 1914.

1,102,957.

Patented July 7, 1914.
3 SHEETS—SHEET 1.

Inventor
Charles E. Rodgers.

Witnesses
F. C. Gibson.
H. Peacock.

By Victor J. Evans
Attorney

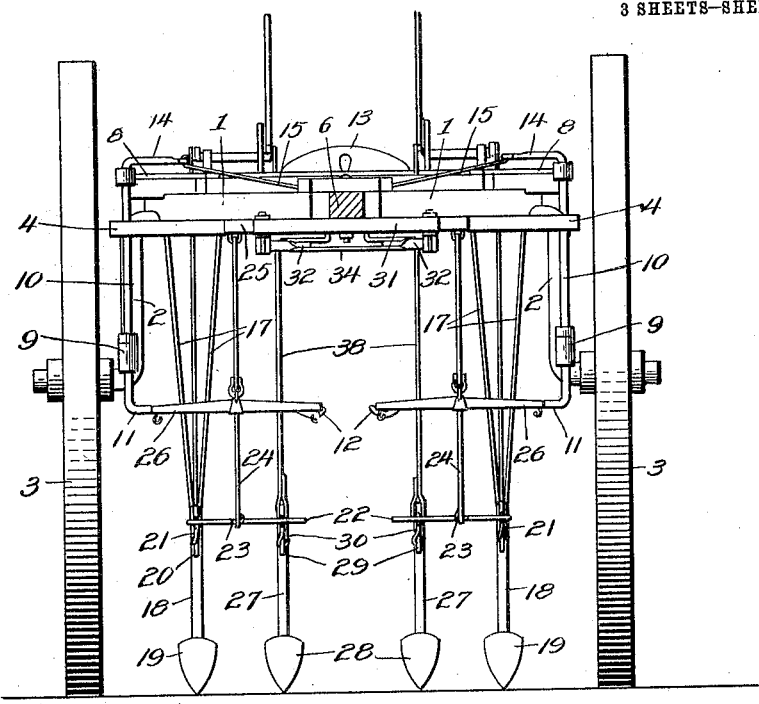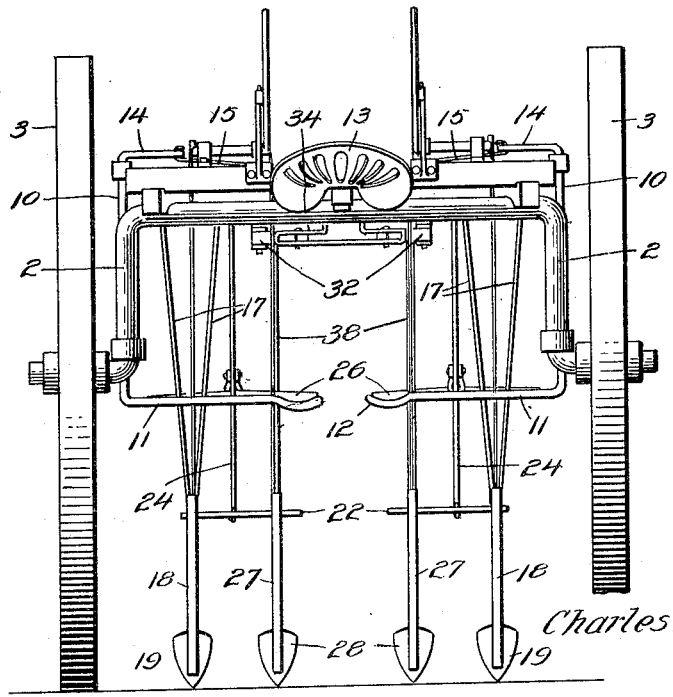

C. E. RODGERS.
CULTIVATOR.
APPLICATION FILED JAN. 21, 1914.
1,102,957.
Patented July 7, 1914.
3 SHEETS—SHEET 3.
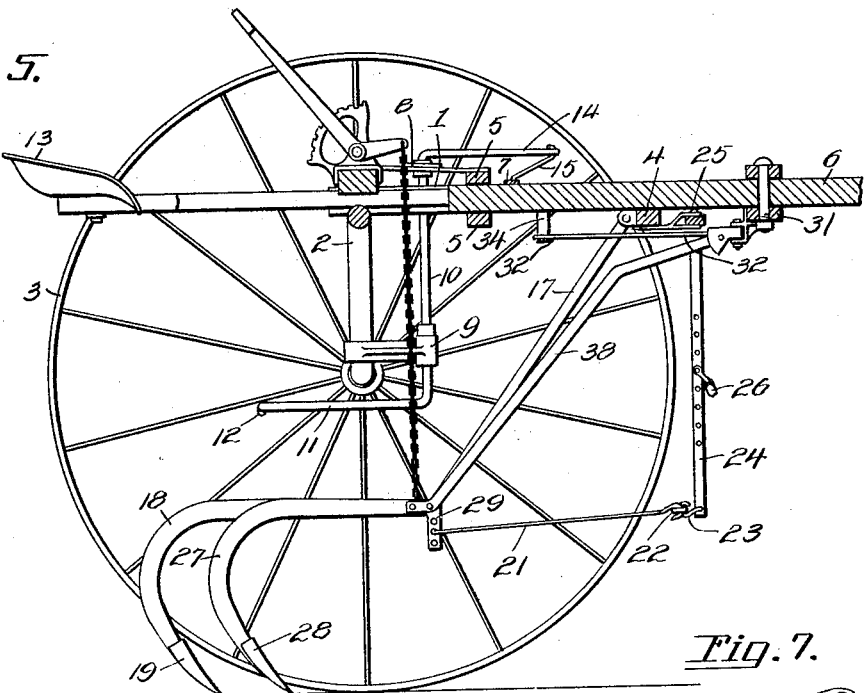
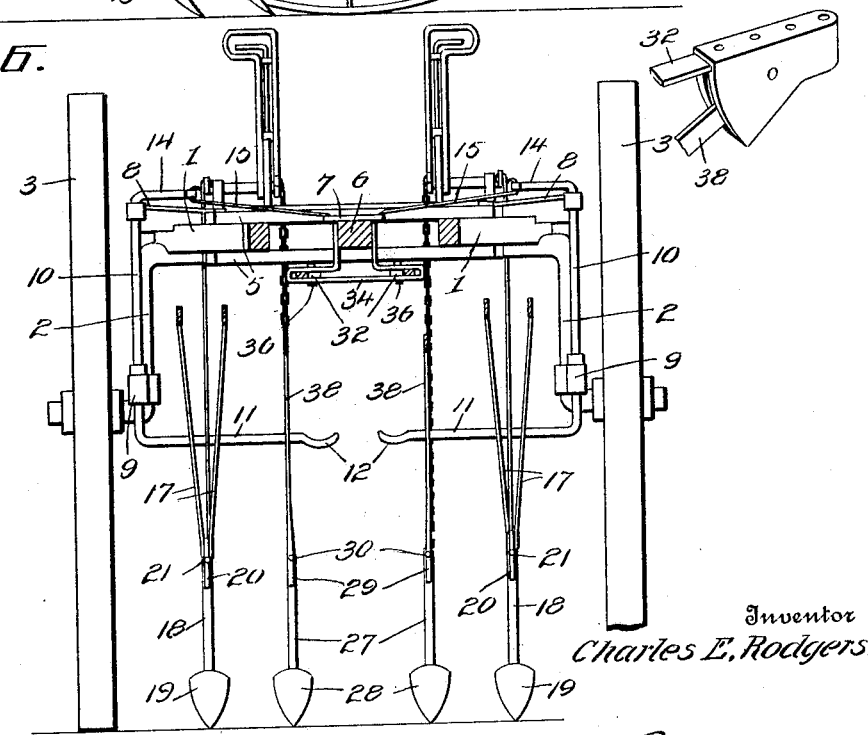
Witnesses
F. C. Gibson.
K. Peacock.
Inventor
Charles E. Rodgers.
By Victor J. Evans
Attorney

UNITED STATES PATENT OFFICE.

CHARLES E. RODGERS, OF SHEPHERDSVILLE, KENTUCKY.

CULTIVATOR.

1,102,957. Specification of Letters Patent. Patented July 7, 1914.

Application filed January 21, 1914. Serial No. 813,477.

*To all whom it may concern:*

Be it known that I, CHARLES E. RODGERS, a citizen of the United States, residing at Shepherdsville, in the county of Bullitt and State of Kentucky, have invented new and useful Improvements in Cultivators, of which the following is a specification.

This invention has relation to cultivators of that type upon which the tongue is pivotally mounted and the invention includes means for operatively connecting the tongue with the standards of the innermost shovels and the invention further consists in novel features hereinafter described and claimed.

An object of the invention is to provide in a riding cultivator means whereby the driver may shift the tongue transversely of the frame of the cultivator by using his feet and at the same time shift the innermost beams and shovels so that the shovels may be caused to operate at desired distances along the row of plants. The tongue is pivotally mounted at the forward portion of the frame and crank shafts are journaled at the sides of the frame and are provided with foot rests and are connected with the rear portion of the tongue. Bars are pivoted at the forward portions of the frame and means is provided for adjustably connecting the rear ends of the bars with the rear portion of the tongue. Rods connect the intermediate portions of the said bars with the forward portions of the innermost beams of the cultivator and consequently as the said bars are swung the innermost beams of the cultivator are moved toward or away from the plants in the row. Draft beams are adjustably connected with the forward ends of the outer and innermost beams of the cultivator and by adjusting said beams the shovels carried by the beams may be caused to operate at a desired distance below the surface of the soil or the cultivator shovels upon the innermost beams may be caused to operate deeper than the outermost shovels or vice-versa.

Figure 1:
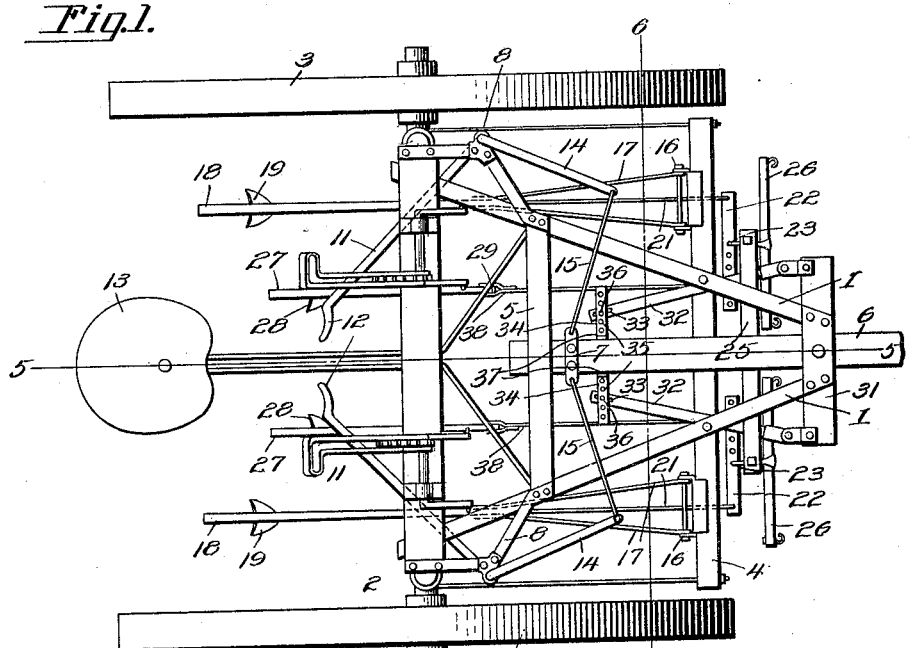
Figure 2:
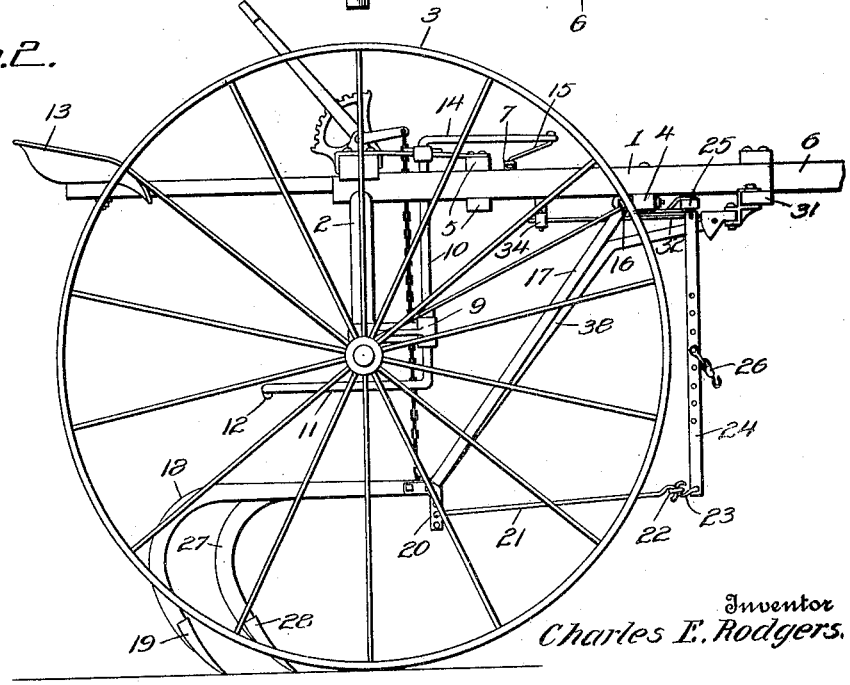

In the accompanying drawings:—Figure 1 is a top plan view of the cultivator. Fig. 2 is a side elevation of the same. Fig. 3 is a front elevation of the same with parts in section. Fig. 4 is a rear elevation of the same. Fig. 5 is a longitudinal sectional view of the same cut on the line 5—5 of Fig. 1. Fig. 6 is a transverse sectional view of the same cut on the line 6—6 of Fig. 1.

The frame of the cultivator includes angularly arranged beams 1 which are mounted at their rear end portions upon an arch axle 2 supported upon ground wheels 3 in the usual manner. A bar 4 extends transversely across the forward portion of the frame and guides 5 extend transversely across the intermediate portions of the side beams 1. A draft tongue 6 is pivoted at the forward end of the frame between the side beams 1 and the rear portion of the said tongue lies between the guides 5. A cross strip 7 is fixed to the rear end portion of the tongue 6. Brackets 8 are fixed to the rear portion of the frame at the opposite sides thereof and bearings 9 are attached to the lower side portions of the axle 2. Shafts 10 are journaled in the brackets 8 and bearings 9 and are provided at their lower edge with inwardly disposed arms 11 having at their inner ends stirrups 12 in which the feet of an operator who occupies the seat 13 may rest. The shafts 10 are provided at their upper ends with forwardly disposed arms 14 and links 15 connect the said crank arms 14 with the ends of the strip 7. Therefore it will be seen that when an operator occupies the seat 13 and with his feet in the stirrups 12 one or the other of the arms 11 may be pushed or swung in a forward direction whereby the attached shaft 10 is rotated or turned and the crank arm 14 of the said shaft will move the attached link 15 longitudinally whereby the tongue 6 is swung upon its pivotal connection with the frame. This will change the line of travel or movement of the frame with relation to the tongue and consequently will assist in affecting the guiding of the cultivator shovels as will be hereinafter explained.

When an operator is in the seat 13 his weight substantially counterbalances the weight of the frame and its attachments extending beyond the forward side of the axle 2 and consequently the weight is approximately evenly balanced upon the said axle.

Brackets 16 are mounted at the end portions of the bar 4 and rods 17 are pivotally connected at one end with the said brackets and fixed at their other ends to the outer cultivator beams 18. The beams 18 carry at their rear ends shovels 19. The forward ends of the beams 18 are turned down as at 20 and links 21 connect the said down turned ends 20 of the beams with a cross bar 22. A link 23 is adjustably mounted on each cross bar 22 and is connected with a rod 24 which in turn is connected with a cross bar 25 mounted at the forward portion of the frame. Swingle trees 26 are adjustably mounted upon the rods 24 and the draft animals are hitched to the said swingle trees in any suitable manner.

The inner cultivator beams 27 are provided at their rear ends with shovels 28 and the forward ends of the beams 27 are down turned as at 29 and links 30 are adjustably connected with the said down turned ends 29 of the beams 27 and are also adjustably connected with the inner ends of the cross bars 22. A cross piece 31 is fixed at the forward portion of the frame and bars 32 are pivoted at the end portions of the said cross piece and at the opposite sides of the tongue 6. The said bars 32 are provided at their rear ends with slots 33 and the rear portions of the said bars pass through a cross piece 34 which extends transversely under the tongue 6. The said cross piece 34 is provided at each end portion with a series of perforations 35 and a pin 36 is adapted to be passed through any one of the perforations 35 and the slot 33 of the bar 32. Therefore it will be seen that the rear ends of the bars 32 may be connected with the cross piece 34 in close proximity to the rear end of the tongue 6 or comparatively remote therefrom. Lugs 37 are mounted upon the cross piece 34 at the opposite side edges of the tongue 6 and consequently as the rear end of the tongue 6 is swung as hereinbefore described the lugs 37 will cause the cross piece 34 to move with the tongue and the movement of the said cross piece will swing the bars 32. Bars 38 are pivotally connected at their upper ends with the intermediate portions of the bars 32 and the said bars 38 are fixed at their lower ends to the forward end portions of the innermost beams 27. Therefore it will be seen that as the bars 32 are swung transversely of the frame the bars 30 are moved correspondingly and the forward ends of the beams 27 are moved transversely of the line of draft or direction in which the cultivator travels. Consequently it will be seen that by swinging the arms 11 at the lower ends of the shafts 10 by using the feet an operator may not only swing the tongues with relation to the frame of the cultivator but at the same time the innermost cultivator beams are moved transversely with relation to the line of plants and for this reason the shovels 28 carried at the rear ends of the said beams may dodge toward or away from the plants and cultivation close to the plants may be effected. This thorough cultivation may be accomplished without excessive labor on the part of the operator for the reason that the innermost beams only are shifted. Should it be desired to cause the shovels 28 to operate at a greater depth in the soil than the shovel 19 the links 23 are adjusted along the cross bars 22 toward the inner ends thereof and consequently the draft or strains from the draft animals is applied more directly to the innermost beams 27 which will cause the forward ends of the beams 27 to be more rigidly held down and the shovels 28 to operate at a greater depth in the soil than the shovels 19. Should it be desired to cause the shovels 19 to operate in the soil at a greater depth than the shovels 28 the links 23 are adjusted or positioned toward the outer end portions of cross bars 22. Should it be desired to cause both the shovels 19 and 28 to operate at a comparatively shallow depth in the soil the trees 26 are adjusted at low positions along the rods 24 and by moving the trees to upper positions in the said rods 24.

Having described the invention what is claimed is:—

1. A cultivator comprising a wheel mounted frame, a tongue pivoted upon the frame for swinging movement transversely of the line of draft, shafts journaled upon the frame and provided at their lower ends with inwardly disposed arms, said shafts having at their upper ends forwardly disposed crank arms, means operatively connecting the crank arms with the tongue, cultivator beams located below the tongue, means pivotally connecting the beams with the frame, and means connecting the forward portions of the beams with the rear portion of the tongue to cause the said beams to move transversely of the line of draft simultaneously with the tongue.

2. A cultivator comprising a wheel mounted frame, a tongue pivoted on the frame for movement transversely on the line of draft, draft means carried at the forward portion of the frame, inner cultivator beams pivotally connected with said draft means, shafts journaled at the side portions of the frame and provided at their lower ends with inwardly disposed arms and having at their upper ends forwardly disposed arms, beams operatively connecting the said forwardly disposed arms with the rear portion of the tongue, bars pivoted at their forward ends to the frame at the opposite sides of the tongue, means operatively connecting the rear portions of the said bars with the tongue, and means operatively connecting the intermediate portions of the bars with the forward end portions of the innermost beams.

3. A cultivator comprising a wheel mounted frame, a tongue pivoted upon the frame for swinging movement transversely of the line of draft, draft means carried at the forward portion of the frame, inner cultivator beams pivotally connected with said draft means, bars pivotally connected with the frame at the opposite sides of the tongue, a cross piece carried at the rear portion of the tongue and receiving the rear ends of the bars, means operatively connecting the intermediate portions of the said bars with the forward end portions of the innermost beams, and means mounted upon the frame for swinging the tongue.

4. A cultivator comprising a wheel mounted frame, a tongue pivoted upon the frame for swinging movement transversely of the line of draft, draft means carried by the frame, inner cultivator beams pivotally connected at their forward ends with the draft means, means mounted upon the frame for swinging the tongue, bars pivotally connected at the forward portion of the frame at the opposite sides of the tongue and provided at their rear ends with slots, a cross piece attached to the tongue and receiving the slotted ends of the bars, pins passing transversely through the cross piece and the slots of the bars and means operatively connecting the intermediate portions of said bars with the forward end portions of the innermost beams.

5. A cultivator comprising a wheel mounted frame, a tongue pivoted upon the frame for swinging movement transversely of the line of draft, a cross piece carried at the rear portion of the tongue, bars pivotally mounted upon the frame at the opposite sides of the tongue and adjustably connected to the cross piece, means mounted upon the frame for swinging the tongue, draft means carried by the frame, inner cultivator beams pivotally connected at their forward ends with the draft means, and bars pivotally connecting the intermediate portions of the first mentioned bars with the forward portions of the innermost beams.

6. A cultivator comprising a wheel mounted frame, a tongue pivoted upon the frame for swinging movement transversely of the line of draft, means mounted upon the frame for swinging the tongue, draft means carried at the forward portion of the frame, innermost beams pivotally connected with the draft means, means for shifting the innermost beams transversely with relation to the draft means, and means operatively connecting the innermost beams with the tongue to cause the same to shift transversely as the tongue is swung.

In testimony whereof I affix my signature in presence of two witnesses.

CHARLES E. RODGERS.

Witnesses:
 DANIEL GOBER,
 EMMET B. HOLSCLAW.